United States Patent
Deng et al.

(10) Patent No.: US 11,362,551 B2
(45) Date of Patent: Jun. 14, 2022

(54) STATOR CORE OF MOTOR

(71) Applicant: FORD GLOBAL TECHNOLOGIES, LLC, Dearborn, MI (US)

(72) Inventors: Chuan Deng, Jiangsu (CN); Yigang Yuan, Jiangsu (CN); Guohua Du, Jiangsu (CN); Xusheng Zhang, Jiangsu (CN); Joy Gong, Jiangsu (CN)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 334 days.

(21) Appl. No.: 16/691,943

(22) Filed: Nov. 22, 2019

(65) Prior Publication Data

US 2020/0169128 A1    May 28, 2020

(30) Foreign Application Priority Data

Nov. 23, 2018   (CN) .......................... 201811409736.9

(51) Int. Cl.
 *H02K 1/18*   (2006.01)
 *H02K 1/16*   (2006.01)

(52) U.S. Cl.
 CPC .............. *H02K 1/185* (2013.01); *H02K 1/16* (2013.01)

(58) Field of Classification Search
 CPC ............ H02K 1/16; H02K 15/02; H02K 1/28; H02K 5/15
 USPC ........... 310/216.058, 216.124–126, 216.129, 310/216.131, 216.133–134, 400
 See application file for complete search history.

(56) References Cited

U.S. PATENT DOCUMENTS

| | | | |
|---|---|---|---|
| 2009/0195116 A1* | 8/2009 | Pong | H02K 1/185 310/216.129 |
| 2015/0042199 A1 | 2/2015 | Iwata et al. | |

FOREIGN PATENT DOCUMENTS

| | | | |
|---|---|---|---|
| CN | 207705897 U | * | 8/2018 |
| JP | 60079229 A | * | 5/1985 |
| JP | 2006223015 A | | 8/2006 |
| JP | 2009201235 A | | 9/2009 |
| JP | 2010178599 A | * | 8/2010 |
| JP | 2010178599 A | | 8/2010 |
| JP | 2013062892 A | | 4/2013 |
| JP | 2013099161 A | | 5/2013 |
| JP | 2017153197 A | | 8/2017 |
| WO | WO2016174889 A1 | | 11/2016 |

OTHER PUBLICATIONS

Machine Translation JP2010178599 (Year: 2010).*
(Continued)

*Primary Examiner* — Jose A Gonzalez Quinones
(74) *Attorney, Agent, or Firm* — Brooks Kushman PC; David Kelley (57) ABSTRACT

A stator core for an electric motor may include a main body part formed by a plurality of stacked electromagnetic steel sheets, the main body part being provided with at least a first through hole extending axially with a first pin located in the first through hole. A first end cover is located at a first end of the main body part and connected to a first pin end of the first pin. A second end cover is located at a second end of the main body part and connected to a second pin end of the first pin. The connections of the first end cover and the second end cover to the first pin generate tensile stresses in the main body part to reduce core losses.

20 Claims, 9 Drawing Sheets

(56) References Cited

OTHER PUBLICATIONS

Kai, Yuichiro et al. Effect of Arbitrary Shear Stress on Vector Magnetic Properties of Non-Oriented Electrical Steel Sheets. IEEE Transactions on Magnetics, vol. 53, No. 11, Nov. 2017. 4 pages.
Kai, Yuichiro et al. Influence of Biaxial Stress on Vector Magnetic Properties and 2-D Magnetostriction of a Nonoriented Electrical Steel Sheet Under Alternating Magnetic Flux Conditions. IEEE Transactions on Magnetics, vol. 50, No. 4, Apr. 2014. 4 pages.
Manufacturing Effects On Iron Losses In Electrical Machines by Konstantinos Bourchas; Degree Project, In Electric Power Engineering, Second Level Stockholm, Sweden 2015; 104 Pages.

\* cited by examiner

STATOR CORE OF MOTOR

CROSS-REFERENCE TO RELATED APPLICATIONS

This application claims foreign priority benefits under 35 U.S.C. § 119(a)-(d) to CN Application 2018 11 40 97 36.9 filed Nov. 23, 2018, which is hereby incorporated by reference in its entirety.

TECHNICAL FIELD

This application relates to a stator core for a motor having a low iron loss (or core loss) and a motor having a low iron loss stator core.

BACKGROUND

Motors are widely applied in vehicles and other fields. Typically, a motor includes a centrally located rotor and a stator surrounding the rotor substantially cylindrically. The rotor and the stator each have a winding formed by winding wires. For the stator, compressive stresses may be generated in a radial region of the stator due to stator stamping, wire winding/embedding, mounting and fixing, and other processes during production. Due to the inherent magnetostriction characteristic of the stator, the compressive stress may increase iron loss in non-oriented electromagnetic steel sheets. A stator lamination method generally adopts a fastening structure and an axial welding structure, and these structures conduct the electromagnetic steel sheets, and further increase the iron loss. Eliminating the compressive stresses generated during mounting of the stator is a challenge.

Japanese Patent Publication No. JP 2013062892 has provided a rotating motor that applies tensile stresses to a stator to reduce iron loss. However, the inventor of the present application realized that the design structure in the prior art is complex and introduces more connection areas, and thus the inventor of the present application realized that there is a need for a stator core designed to have reduced iron loss without one or more of the disadvantages of the prior art.

SUMMARY

According to one aspect of the present application, a stator core is provided. The stator core may include: a main body part formed by a plurality of stacked electromagnetic steel sheets, the main body part being provided with at least a first through hole extending axially; a first pin located in the first through hole; a first end cover located at a first end of the main body part and connected to a first pin end of the first pin; and a second end cover located at a second end of the main body part and connected to a second pin end of the first pin, wherein connections of the first end cover and the second end cover to the first pin generate tensile stresses in the main body part.

In one embodiment, the first through hole has a first inner surface close to a central axis of the stator core and a second inner surface away from the central axis, the first pin is spaced apart from the first inner surface, and the first pin contacts the second inner surface and generates a thrust force against the first inner surface. In another embodiment, the first pin end of the first pin is connected to the first end cover by means of an interference fit, wherein the second pin end of the first pin is integrated with the second end cover. In still another embodiment, the first pin end of the first pin is connected to the first end cover by means of an interference fit, and the second pin end of the first pin is connected to the second end cover by means of an interference fit.

In still another embodiment, the first end cover has a first contact part protruding from an inner surface of the first end cover to contact the first pin; the second end cover has a second contact part protruding from an inner surface of the second end cover to contact the first pin; the first and second contact parts are configured to be interference-fitted with the first pin such that the first pin generates a thrust force against a part of an inner surface of the first through hole, thereby generating a tensile stress in a main magnetic flux region of the stator core.

In still another embodiment, the first end cover has a first contact part protruding from an inner surface of the first end cover to contact the first pin, and the second end cover has a second contact part protruding from an inner surface of the second end cover to contact the second pin; the inner surface of the first end cover has a first recess adjacent to the first contact part to receive the first pin end, and a part of an outer wall of the first contact part forms an inner wall of the first recess; the inner surface of the second end cover has a recess adjacent to the second contact part to receive the second pin end, and a part of an outer wall of the second contact part forms an inner wall of the second recess; the first contact part is configured to be interference-fitted with the first pin such that the first pin generates a thrust force against a part of an inner surface of the first through hole, thereby generating a tensile stress in a main magnetic flux region of the stator core.

In still another embodiment, the first pin end includes a first inclined surface facing toward a central axis, the first end cover has a first contact part protruding from an inner surface thereof to be fitted with the first inclined surface, a surface of the first contact part opposite the first inclined surface is an inclined surface, and the first contact part is interference-fitted with the first inclined surface such that the first pin generates a thrust force against a part of an inner surface of the first through hole, thereby generating a tensile stress in a main magnetic flux region of the stator core.

In still another embodiment, the first pin end includes a first inclined surface facing toward a central axis, the first end cover has a first contact part protruding from an inner surface thereof to be fitted with the first inclined surface, and a surface of the first contact part opposite the first inclined surface is an inclined surface, wherein the second pin end includes a second inclined surface facing toward the central axis, the second end cover has a second contact part protruding from an inner surface thereof to be fitted with the second inclined surface, and a surface of the second contact part opposite the second inclined surface is an inclined surface; the first contact part is interference-fitted with the first inclined surface and the second contact part is interference-fitted with the second inclined surface such that the first pin generates a thrust force against a part of an inner surface of the first through hole, thereby generating a tensile stress in a main magnetic flux region of the stator core.

In still another embodiment, the first pin is made from a non-magnetically permeable material.

In still another embodiment, the first through hole is arranged close to an outer annular peripheral edge of the main body part.

In still another embodiment, the first through hole is partially located outside an annular peripheral edge of the main body part.

In still another embodiment, the stator core further includes a second pin, and the main body part includes a second through hole for receiving the second pin.

In still another embodiment, the stator core further includes a second pin and a third pin, and the main body part further includes a corresponding second through hole and a corresponding third through hole; the first, second, and third through holes are evenly spaced apart from each other circumferentially, the first and second end covers are interference-fitted with the first, second, and third pins such that tensile stresses are generated in a main magnetic flux region of the stator core along the through holes.

In still another embodiment, the stator core further includes a second pin, a third pin, a fourth pin, a fifth pin, and a sixth pin; the main body part further includes a second through hole, a third through hole, a fourth through hole, a fifth through hole, and a sixth through hole spaced apart from each other; the first and second end covers each include contact parts fitted with the second, third, fourth, fifth, and sixth pins; the fittings of the first and second end covers with the first, second, third, fourth, fifth and sixth pins generate thrust forces against the plurality of through holes, thereby generating tensile stresses in a main magnetic flux region of the stator core.

In still another embodiment, the first, second, third, third, fifth, and sixth through holes and the first, second, third, fourth, fifth, and sixth pins have substantially the same structure, and the plurality of through holes are evenly distributed along a circumference of the main body part.

According to another aspect of the present application, a stator core is provided. The stator core may include: a main body part formed by a plurality of stacked electromagnetic steel sheets, the main body part being provided with a first through hole and a second through hole extending axially; a first pin and a second pin arranged in the first and second through holes, the first pin and the second pin being used for integrating the plurality of electromagnetic steel sheets; a first end cover located at a first end of the main body part and contacting the first pin and the second pin, and a second end cover located at a second end of the main body part and contacting the first pin and the second pin, the first pin and the second pin being interference-fitted with the first end cover and the second end cover to generate tensile stresses in a main magnetic flux region of the main body part; a fastener through hole penetrating axially through the first and second end covers and the main body part; and an axial fastener extending through the fastener through hole.

In one embodiment, the fastener through hole is located outside an annular outer circumference of the main body part.

In another embodiment, the main body part includes a first lug and a second lug extending axially, the first and second lugs are at least partially located outside the outer circumference of the main body part, the first and second through holes are at least partially located in the first and second lugs, and the first and second end covers each have protruding parts covering the first lug and the second lug.

According to another aspect of the present application, a stator core is provided. The stator core may include: a main body part formed by a plurality of stacked electromagnetic steel sheets, the main body part being provided with a first through hole, a second through hole, and a third through hole extending axially; a first pin, a second pin, and a third pin extending in the first, second and third through holes, respectively; a first end cover located at a first end of the main body part and contacting the first pin, the second pin, and the third pin, and a second end cover located at a second end of the main body part and contacting the first pin, the second pin, and the third pin, the first pin, the second pin, and the third pin being interference-fitted with the first end cover and the second end cover to generate tensile stresses in a main magnetic flux region of the main body part; a fastener through hole axially penetrating through the first and second end covers and the main body part; and a fastener extending through the fastener through hole, wherein the first pin, the second pin, the third pin, the first end cover, the second end cover, and the fastener together form a connection structure for connecting the plurality of electromagnetic steel sheets, wherein a welding joint does not exist between the plurality of electromagnetic steel sheets.

In one embodiment, the first end cover includes a first contact part, a second contact part, and a third contact part protruding from an inner surface thereof; the first, second, and third contact parts respectively contacting first pin ends of the first, second, and third pins; and the second end cover includes a fourth contact part, a fifth contact part, and a sixth contact part protruding from an inner surface thereof; the fourth, fifth, and sixth contact parts respectively contacting second pin ends of the first, second and third pins.

In still another embodiment, directions of tensile stresses located at a yoke part and generated in a plurality of through holes by fitting of the plurality of pins with the first end cover and the second end cover are substantially coincident with a magnetic flux direction.

In still another embodiment, an angle between the direction of at least a part of the tensile stresses and the magnetic flux direction is within 90 degrees.

In still another embodiment, an angle between the direction of at least a part of the tensile stresses and the magnetic flux direction is within 45 degrees.

The above and other advantages and features of the present application will become apparent as one reads the Detailed Description separately or with reference to the accompanying drawings.

BRIEF DESCRIPTION OF THE DRAWINGS

For a more complete understanding of embodiments of the present application, reference should be made to more detailed description in the accompanying drawings and the embodiments described through examples below. In the drawings.

DETAILED DESCRIPTION

The same or similar reference numerals in the accompanying drawings are used to indicate the same or similar components. In the following description, a plurality of operational parameters and components are described in a plurality of embodiments. These specific parameters and components are included herein as examples only and are not meant to be limiting.

Specific embodiments of the present application are disclosed in the description as needed; however, it should be understood that the disclosed embodiments are only examples of the present application and may be implemented in various alternative forms. The accompanying drawings are not necessarily drawn proportionally or to scale; some features may be enlarged or reduced to show details of specific components. Therefore, the specific structural and functional details disclosed herein are not to be construed as limiting, but are merely a representative basis for teaching those skilled in the art to implement the present application in various forms.

As mentioned in the background, motors are widely used, and improvement in the performance of the motor is the focus of research. For a stator, how to reduce iron loss (core loss) is one aspect of performance improvement. The stator of the motor may be subjected to a compressive stress due to various reasons during assembly. For example, a compressive stress is generated in a conventional stator structure during sheet stacking, wire winding, and assembly, and the compressive stress increases the iron loss of electromagnetic steel sheets. The electromagnetic steel sheets are generally stacked by means of fastening structures and an axial welding structure. The term fastening structure may refer to a connection feature located on an electromagnetic steel sheet, and may also refer to an additional fastener that causes two or more electromagnetic steel sheets to engage with each other. However, both the fastening and the welding joints are conductive as are the electromagnetic steel sheets, which further increases the iron loss. The inventor of the present application designs a more effective stator fixing structure in one or a plurality of embodiments in order to solve one or a plurality of the problems in the prior art.

Figure 1A:
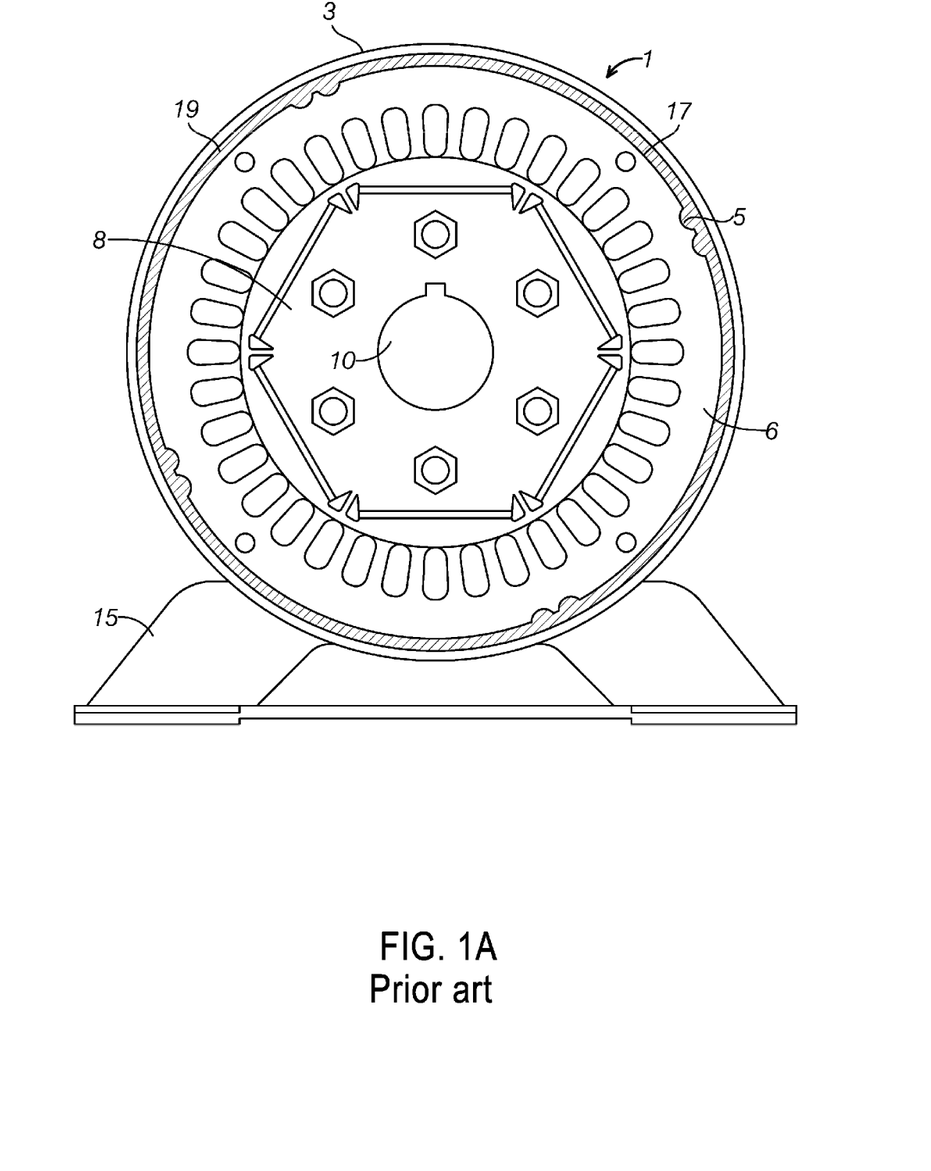
FIG. 1A and FIG. 1B are schematic structural views of a stator in the prior art.
Figure 1B:
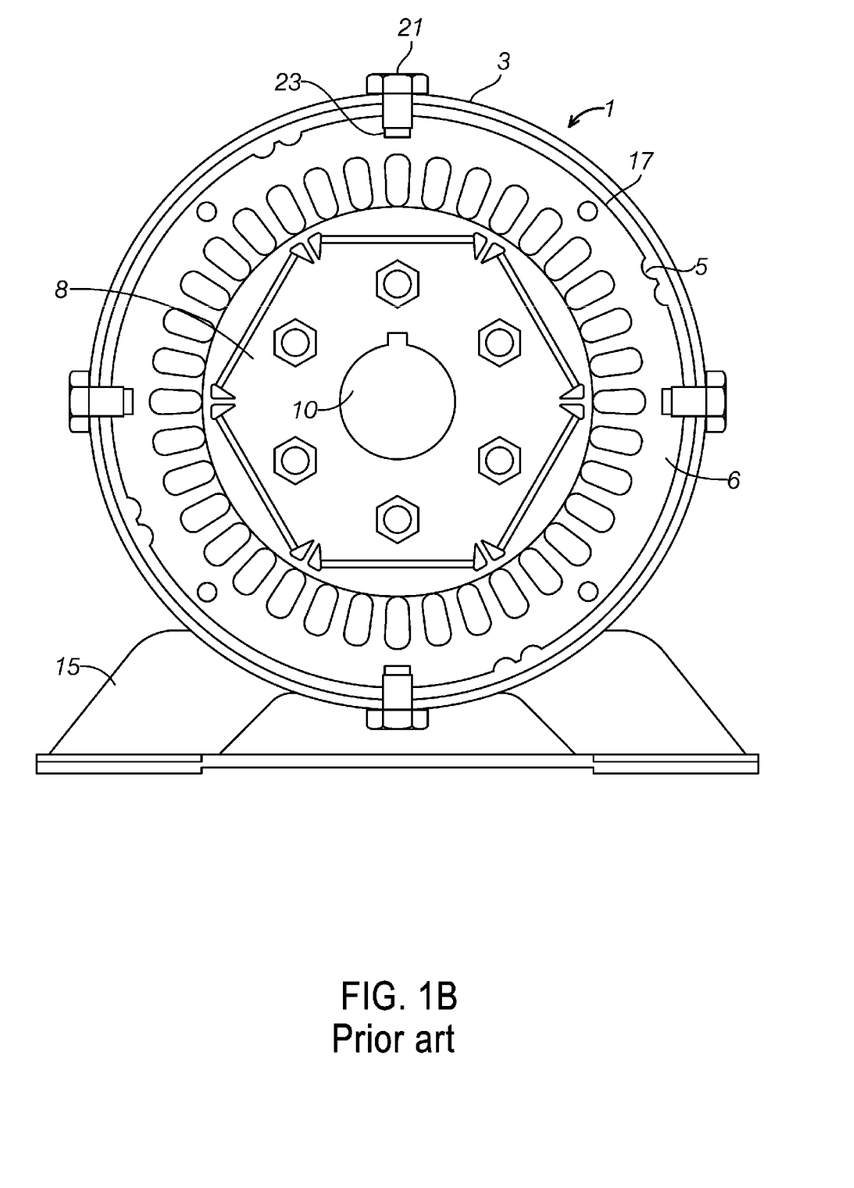

Please refer to the prior art rotating motor as provided in Japanese Patent Publication No. JP 2013062892 and generally illustrated in FIG. 1A and FIG. 1B. That patent discloses a stator core 5 formed by stacking electromagnetic steel sheets 6, a peripheral frame 3 used for mounting the stator core 5, and a rotor 8 located in the middle is concentrically arranged in the stator core 5. A gap 17 is formed between the outer circumference of the stator core 5 and the inner circumference of the frame 3, and the gap 17 is filled with an adhesive 19 to mount the stator core 5 to the frame 3. In the motor 1, the stator core 5 is located in the frame 3, and the iron core 5 can be radially stretched away from a central axis by means of the adhesive 19 and radially arranged bolts 21 at positions where the bolts are mounted. However, the circumferentially arranged bolts increase the radial size, and the structure is complex. Furthermore, the use of the adhesive adds a procedure to the process.

Figure 2:
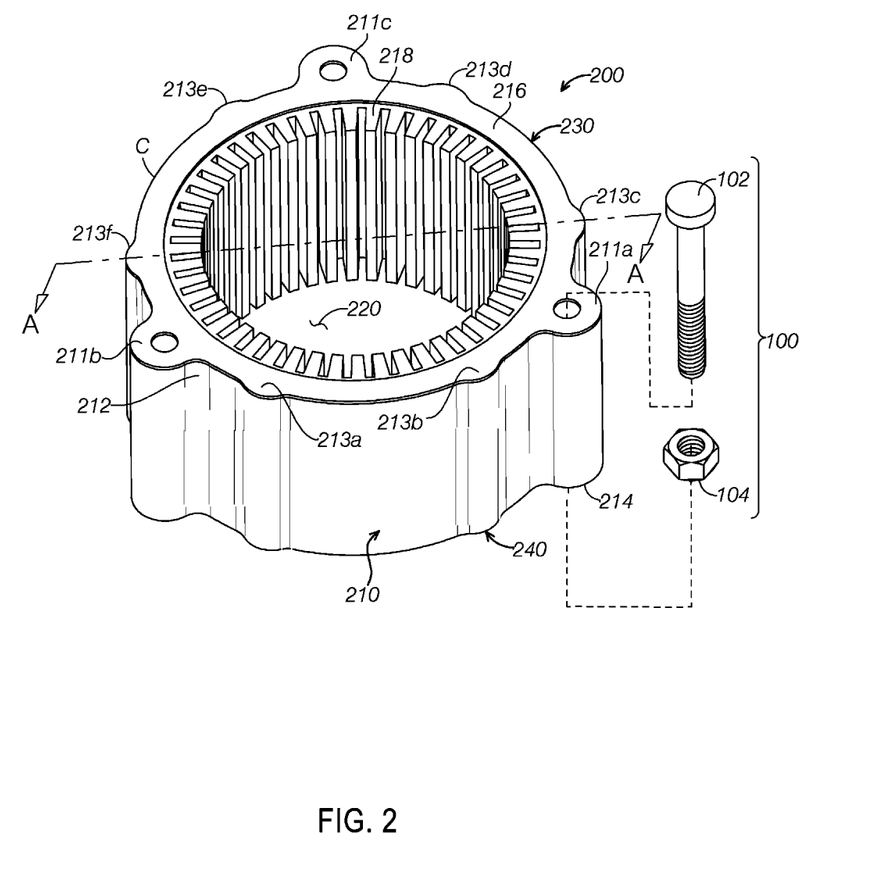
FIG. 2 is a perspective view of the structure of a stator core according to a first embodiment of the present application.

FIG. 2 is a perspective view of a stator core 200 according to a first embodiment of the present application. As shown in the drawing, a stator core 200 is provided in the first embodiment, including a columnar main body part 210 having a first end 212 and a second end 214. In this embodiment, the main body part 210 is formed by stacking and connecting a plurality of electromagnetic steel sheets. The electromagnetic steel sheets may be silicon steel sheets or other suitable materials having similar electromagnetic properties. The stator core main body part 210 formed by means of stacking includes a substantially annular yoke part 216, and a tooth part 218 surrounded by the yoke part 216. Slots for winding wires are formed between the teeth adjacent to each other, and the slots are filled with the wound wires to form stator windings. Further, the main body part 210 includes an axially extending opening or space 220 located at the center, that is, the main body part 210 is a hollow column. The opening 220 is used for receiving a rotor. Depending on the motor design, the type and design of the rotor can be different. The present application analyzes the stator structure design, but the rotor structure is not discussed here.

Figure 3A:
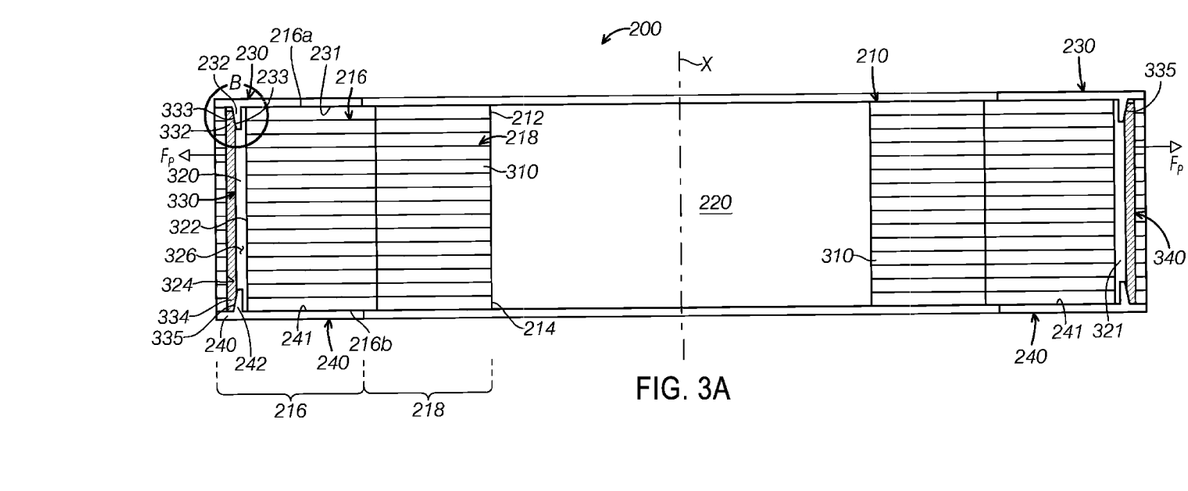
FIG. 3A is a schematic view of an end cover and a pin connection structure of the stator core according to the first embodiment of the present application.

Please refer to FIG. 2 and further to FIG. 3A. FIG. 3A is a schematic cross-sectional view of the stator core 200 of FIG. 2 in the A-A direction shown in the drawing. A first end cover 230 is connected to the first end 212 of the main body part 210 of the stator, and a second end cover 240 is connected to the second end 214. The manner of connecting the first end cover 230, the second end cover 240, and the main body part 210 will be explained below with reference to other accompanying drawings and embodiments.

Please refer further to FIG. 2 and FIG. 3A. In the embodiment described above, the yoke part 216 is substantially an annular column, and the yoke part 216 has a first end surface 216a and a second end surface 216b at the first end 212 and the second end 214, respectively. The first end cover 230 generally covers the first end surface 216a of the yoke part 216 of the main body part 210, and the second end cover 240 generally covers the second end surface 216b of the yoke part 216. It is envisioned that the first end cover 230 can have a suitable size corresponding to the cross-section of the yoke part 216, and can partially or fully cover the first and second end surfaces 216a, 216b of the yoke part 216. In the described embodiment, the main body part 210 further includes a plurality of lug parts that protrude along the outer circumference of the yoke part 216, such as fastener lug parts 211a, 211b, and 211c, and pin connection lug parts 213a, 213b, 213c, 213d, 213e, and 213f. The fastener lug parts 211a, 211b, and 211c can each include a through hole through which a fastener 100 can pass, the through hole penetrates axially through the lug part, and the fastener can pass through the through hole and axially apply a pressure to the main body part 210. The representative fastener 100 in FIG. 2 includes a bolt 102 and a nut 104. It should be understood that the fastener can be any suitable fastener. The pin connection lug parts 213a, 213b, 213c, 213d, 213e, and 213f can be used to provide through holes and receive pins, and the connections of the end covers to the main body part and the pins will be described in detail below.

Figure 3B:
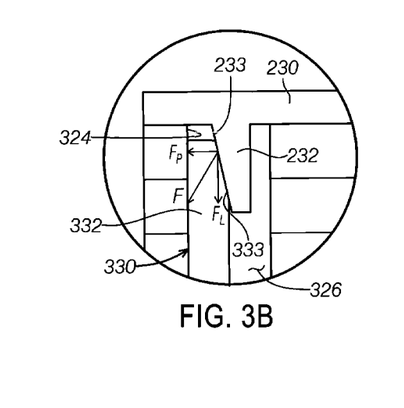
FIG. 3B is an enlarged schematic view of a region B in FIG. 3A.

Further, as shown in FIG. 2 to FIG. 3B, the first end cover 230 (and/or the second end cover 240) may have protruding parts corresponding to the shape of the plurality of lug parts so as to cover the lug parts. In the described embodiment, the fastener lug parts 211a, 211b, and 211c are generally located outside an outer circumference C of the main body part to avoid possible adverse effects on a magnetic flux region of the yoke part. Three fastener lug parts 211a, 211b, and 211c distributed evenly and fastener holes are shown in FIG. 2, and it is understood that more or fewer fasteners may be provided as needed. In addition, although the fastener as shown is arranged outside the circumference or at a position outside a main magnetic flux region of the yoke part 216, the fastener may be arranged adjacent to the outer edge of the circumference depending on the shape of the motor core. In other words, the fastener may be partially arranged on the outer circumference of the yoke part. In the embodiments of FIG. 2, FIG. 3A, and FIG. 3B, the pin connection lug parts 213a, 213b, 213c, 213d, 213e, and 213f are generally located outside the outer circumference of the main body part. It should be understood that the main body part may also not include a pin connection lug part, and the through hole of the pin may also be arranged generally within the outer circumference C of the main body part.

Please refer to FIG. 3A. In the described embodiment, the yoke part 216 of the main body part 210 may include a plurality of through holes that receive pin connection structures. FIG. 3A shows that the yoke part 216 may include a first through hole 320 and a second through hole 321, that is, a first pin 330 and a second pin 340 respectively located in the first through hole 320 and the second through hole 321. In the drawing, a connection structure of the second pin 340 in the second through hole 321 is similar to that of the first pin 330 in the first through hole 320, and only structures of the first through hole 320 and the first pin 330 are described in detail herein. FIG. 3A schematically shows a plurality of stacked electromagnetic steel sheets 310, and it is understood that the thickness is exaggerated for illustration and does not represent the actual dimension. The main body part 210 formed by stacking the plurality of electromagnetic steel sheets 310 is provided with at least a first through hole 320 penetrating axially, and a first pin 330 extending axially in the first through hole 320. A first end 212 of the main body part 210 is provided with a first end cover 230, and a second end 214 may be provided with a second end cover 240. The first pin 330 includes a first pin end 332 that is substantially located at or adjacent to the first end 212 of the main body part 210 and a second pin end 334 that is located at or adjacent to the second end 214 of the main body part 210. The connection of the first end cover 230 and the second end cover 240 to the first pin 330 generates a tensile stress in the main body part 210 of the iron core, the principle and test results of which will be further explained with reference to the accompanying drawings.

Please refer further to FIG. 3A. In the described embodiment, the first pin end 332 of the first pin 330 is connected to the first end cover 230 by means of an interference fit, and the second pin end 334 of the first pin 330 is connected to the second end cover 240 by means of an interference fit. Specifically, the first end cover 230 has an inner surface 231 facing toward the first end part 212 and includes a first contact part 232 at least partially protruding from the inner surface 231, and the second end cover 240 has an inner surface 241 facing toward the second end part 214 and includes a second contact part 242 at least partially protruding from the inner surface 241. The first pin end 332 and the second pin end 334 of the first pin 330 contact the first contact part 232 and the second contact part 242, respectively. The first contact part 232 and the second contact part 242 may have any suitable configuration, and the contact between the first pin 330 and the first contact part 232 and between the first pin 330 and the second contact part 242 may be a suitable point-to-point, line-to-line, and surface-to-surface contact. The first contact part 232 and the second contact part 242 are configured to be interference-fitted with the first pin end 332 and the second pin end 334 such that the first pin 330 generates a thrust force Fp against a second inner surface 324 of the first through hole 320. The second inner surface 324 is a surface that forms the first through hole 320 and is away from the central axis. Therefore, a tensile stress is generated in a main magnetic flux region or the yoke part 216 of the stator core 310. In the described example, the first and second pin ends 332, 334 have a first inclined surface 333 and a second inclined surface 335 facing toward the central axis X, the first contact part 232 of the first end cover 230 contacts and presses the first inclined surface 333, and a surface 233 of the first contact part 232 opposite the first inclined surface 333 may also be a corresponding inclined surface.

FIG. 3B shows a region B of FIG. 3A; that is, FIG. 3B is an enlarged view of interference-fitting of the first pin end 332 with the first contact part 232 and the first inclined surface 333. As shown in FIG. 3B, the corresponding inclined surface 233 of the first contact part 232 of the first end cover 230 contacts the first inclined surface 333 of the first pin, and the inclined surface may have certain roughness. In one or a plurality of embodiments, the end cover 230 and the main body part 210 are fixed by a fastening force of the external fastener 100, such as the bolt 102 and the nut 104 described above. The force applied by the fastener 100 to one or a plurality of points generates component forces $F_L$, $F_p$ by means of the contact between one or a plurality of contact parts on the first end cover 230 and an inclined surface of one or a plurality of pins. As shown in FIG. 3B, the force F generated by the action of the fastener 100 on the inclined surface 333 is shown, and the force F will generate the axial fastening force $F_L$ and the thrust force $F_p$ as shown, such that the axial fastening force $F_L$ and the radial thrust force Fp are distributed around the circumference of the stator. In other words, the end cover and the pin have a radial fixing effect on the plurality of electromagnetic steel sheets 310, and thus can replace the connection of the fastening point and the welding joint on the conventional stator. The thrust force Fp further generates a radial tensile stress and a tangential tensile stress in the material structure at the yoke part 216, such that iron loss can be reduced.

Please refer further to FIG. 3A and FIG. 3B. In the described embodiment, the first through hole 320 has a first inner surface 322 that is relatively close to the central axis X of the stator core and the second inner surface 324 that is away from the central axis. The first inner surface 322 and the second inner surface 324 are not distinguished from each other by a definite boundary and may have an appropriate and relatively flat or curved shape. The first inner surface 322 and the second inner surface 324 may have a relatively large or small or the same size depending on the design. The first pin 330 is spaced apart from the first inner surface 322, and the so-called spacing indicates at least a part of a gap 326 exists between them and they do not contact each other. The first pin 330 contacts the second inner surface 324 and generates a thrust force $F_p$ against the second inner surface 324 as shown in the drawing. The pin 330 is restricted by the second inner surface, and further presses the second inner surface 34 to generate the above thrust force $F_p$. The thrust force $F_p$ will further produce the radial tensile stress and the tangential tensile stress within the material structure.

In the embodiment described above, the first through hole 320 has a substantially rectangular cross section, and in other examples, the first through hole has an oblong cross section. In still other examples, the first through hole has a circular cross section. The first pin 330 may also have an adapted cross-sectional shape, and the contact between the first pin 330 and the second inner surface 324 may be a point-to-point contact, a line-to-line contact or a surface-to-surface contact, and may be a line-to-line or surface-to-surface contact in the axial direction to apply the force more evenly. As described with reference to FIG. 3B, when the second inner surface 324 is subjected to the thrust force $F_p$, the material structure is connected, and thus a tensile stress is generated around the first through hole 320, thereby generating the tensile stress in the yoke part 216 of the stator core, i.e., the main magnetic flux region. A radial tensile stress and a tangential tensile stress may be at a certain point of the material such that the tensile stress may be in a plurality of directions, and at least a part of the tensile stress is in the direction substantially coincident with a magnetic flux direction, and distributed surrounding the yoke part.

In the above embodiment, the first pin end 332 and the second pin end 334 of the first pin 330 are interference-fitted with the first contact part 232 at least partially protruding from the first end cover 230 and the second contact part 234 at least partially protruding from the second end cover 240; however, one can conceive that other suitable connection manners exist.

Figure 4:
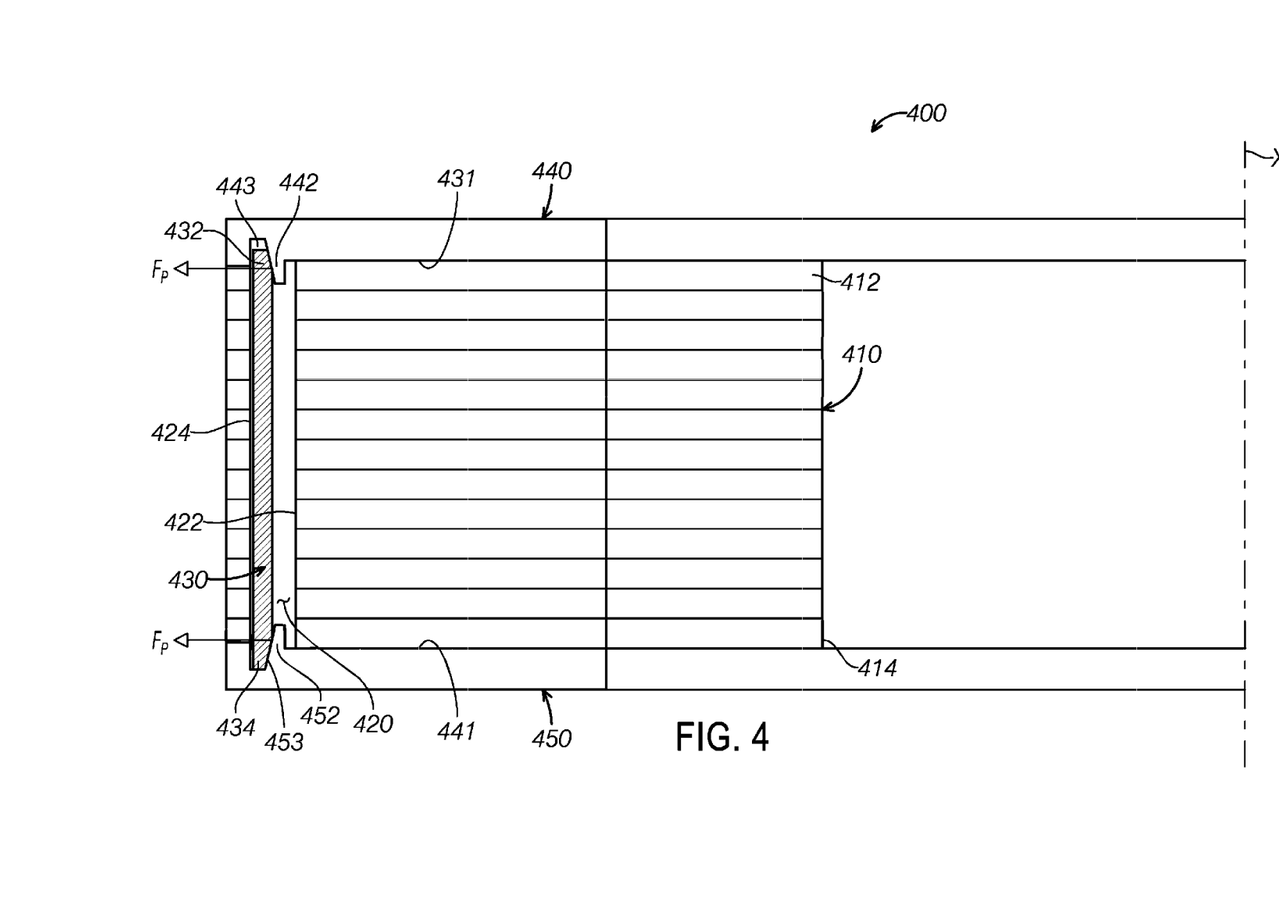
FIG. 4 is a schematic view of a connection of an end cover and a pin of a stator core according to a second embodiment of the present application.

For example, FIG. 4 shows a stator 400 according to another embodiment of the present application. Similar to the embodiment of FIG. 3A and FIG. 3B described above, a main body part 410 formed by stacking electromagnetic steel sheets is provided with at least a first through hole 420 penetrating axially, and a first pin 430 extending axially in the first through hole 420. The first pin 430 includes a first pin end 432 located at a first end 412 of the main body part 410 and a second pin end 434 located at a second end 414 of the main body part 410. Connections of a first end cover 440 and a second end cover 450 to the first pin 430 generate tensile stresses in the main body part 410 of an iron core. Similarly, the first through hole 420 has a first inner surface 422 close to a central axis of the stator core and a second inner surface 424 away from the central axis, the first pin 430 is spaced apart from the first inner surface 422, and the first pin 430 contacts the second inner surface 424 and generates a thrust force Fp against the second inner surface 424 as shown in the drawing. The first end cover 440 and the second end cover 450 have a first contact part 442 and a second contact part 452 that protrude from inner surfaces 431, 441 of the first and second end parts 412, 414, respectively. Unlike the embodiment of FIG. 3A and FIG. 3B described above, the first end cover 440 further includes a first recess 443 adjacent to the first end cover 440. The second end cover 450 and the second end cover 450 further include a second recess 453 adjacent to the first end cover 440 and the second end cover 450. A side wall of the first contact part 442 forms a part of an inner wall of the first recess 443. A side wall of the second contact part 452 forms a part of an inner wall of the second recess 453. The first contact part 442 and the second contact part 452 are configured to be interference-fitted with the first pin 430 such that the first pin 430 generates a thrust force $F_p$ against a part of an inner surface of the first through hole 420, i.e., the second inner surface 424, thereby generating a tensile stress in the stator core. In this embodiment, the length of the first pin 430 may be slightly larger than the thickness of the main body 410 of the stator core or the depth of the first through hole 420.

The above one or plurality of embodiments describe the pin that is independent of the first and second end covers; however, it is understood that the pin can also be pre-assembled or integrated with one of the end covers. In other words, the first pin end and the second pin end are not necessarily independent of the first end cover and the second end cover, respectively, as in the embodiments described above with reference to FIG. 3A and FIG. 3B and with reference to FIG. 4.

Figure 5:
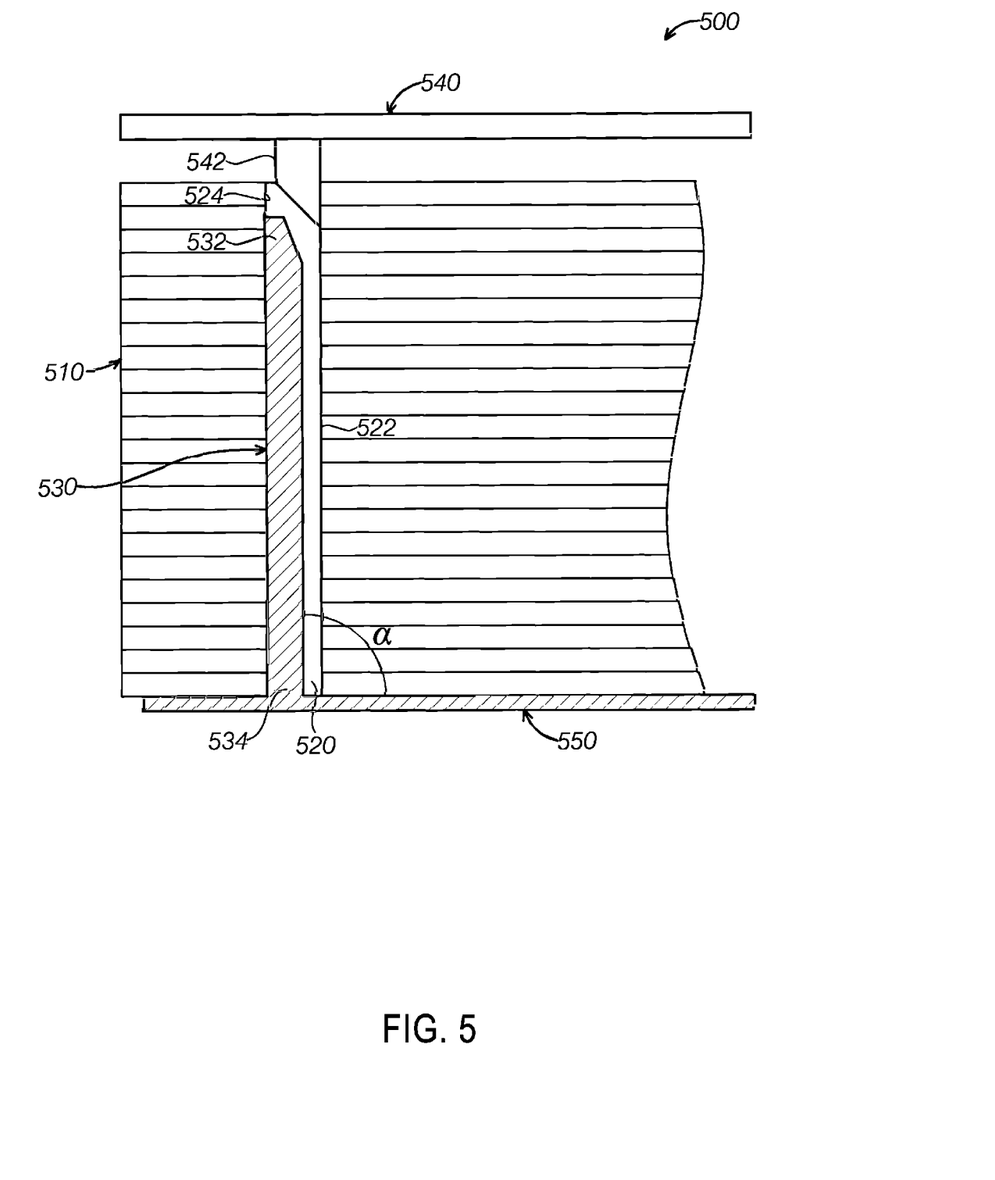
FIG. 5 is a schematic view of a connection of an end cover and a pin of a stator core according to a third embodiment of the present application.

Please refer to FIG. 5, which is a partial cross-sectional view of a stator 500 according to another embodiment of the application, in which a first end cover 540 of the stator 500 is in a non-mounted state. In one embodiment, a main body part 510 of the stator core 500 has a first through hole 520 penetrating axially, and a first pin 530 extending axially through the first through hole 520. In a mounted state, a first pin end 532 of the first pin 530 is connected to a first end cover 540 by means of an interference fit. A second pin end 534 of the first pin 530 is integrated with a second end cover 550. Similarly, the first through hole 520 has a first inner surface 522 close to a central axis of the stator core and a second inner surface 524 away from the central axis, and the first pin 530 is spaced apart from the first inner surface 522. In this embodiment, the second pin end 534 is integrated to the second end cover 550, and the first pin 530 is arranged in a position so as to be interference-fitted with or contact the second inner surface 524 of the first through hole 520 after mounting. In other words, during mounting, the second pin end 534 can be relatively pressed against the second inner surface 524 of the first through hole 520. In other examples, the first pin end 522 may be slightly inclined towards the central axis X to facilitate insertion into the first through hole 520, that is, an angle α shown in the drawing can be slightly less than 90 degrees. When the first end cover 540 presses the first pin end 532, the first pin 530 can be caused to generate a thrust force against the second inner surface 524 through the axial direction. The difference from the embodiments shown in FIG. 3A, FIG. 3B, and FIG. 4 is that the second pin end 520 of the first pin 530 is integrated with the second end cover 550 in this embodiment, and the mounting becomes relatively easy by appropriate size control. During mounting, the first pin 530 and the second end cover 550 that are integrated are first inserted from one side such that the first pin 530 passes through the through hole 520, and then the first contact part 542 of the first end cover 540 can be aligned with the first through hole and fitted to the first pin end 532 of the first pin 530, thus completing the connection. The end cover having one side integrated with the pin shown in FIG. 5 can also be combined with the above interference-fitted split pin in FIG. 3 and FIG. 4; the first through hole and the second through hole which is different from the first through hole each adopt different pin end part connection manners. For example, the second end cover 550 has the integrated first pin 530 and a second contact part for being inserted into the second through hole. A second pin is independent of the second end cover. The integrated first pin 530 can further function for positioning.

Please refer to FIG. 6A to FIG. 6D and further to FIG. 2 to FIG. 5. In one or a plurality of embodiments, a plurality of through holes and a plurality of pins may be circumferentially arranged along the yoke part 216 of the stator core, and a plurality of pin ends are correspondingly fitted with a plurality of contact parts located at the end covers. For simplicity of illustration, only top views and side views of the first end cover are shown in FIG. 6A to FIG. 6D. It is understood that the second end cover may have a similar structure or the second end cover may be integrated with the pin. It is envisioned that the main body part may be designed to have through holes corresponding to the arrangement and the quantity of the plurality of contact parts on the end covers.

Figure 6A:
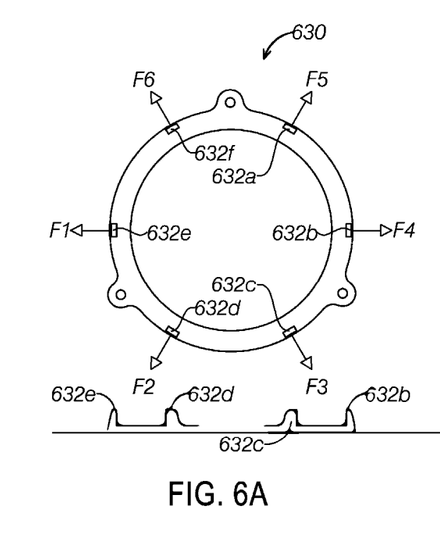
FIG. 6A, FIG. 6B, FIG. 6C, and FIG. 6D are schematic views of a variety of representative structures of an end cover according to one or a plurality of embodiments of the present application.

FIG. 6A shows an embodiment of a schematic view of a first end cover 630. In this example, the first end cover 630 has six protruding contact parts. A main body part of a stator core may correspondingly include a first through hole, a second through hole, a third through hole, a fourth through hole, a fifth through hole, and a sixth through hole spaced apart from each other for pin connection. Moreover, the stator core further includes a first pin, a second pin, a third pin, a fourth pin, a fifth pin, and a sixth pin located in the first, second, third, fourth, fifth, and sixth through holes. As described in the above example, the main body part of the stator core may include through holes surrounding the main body part and for being passed through by fasteners, which will not be described in detail here for the sake of brevity. The first end cover 630 (and/or a second end cover not shown) may include contact parts 632a, 632b, 632c, 632d, 632e, and 632f fitted with the first, second, third, fourth, fifth, and sixth pins. The protruding contact parts 632a, 632b, 632c, 632d, 632e, and 632f have generally rectangular cross sections perpendicular to the axial direction. Accordingly, the plurality of through holes may have substantially rectangular cross sections. In other embodiments, the through holes may be in an appropriate shape such as an elliptical shape and an oblong shape. The through holes are slightly larger in size than the cross sections of the protruding contact parts 632a, 632b, 632c, 632d, 632e, and 632f and the pins, so as to generate gaps. The fitting of the first end cover 630 and/or the second end cover with the plurality of pins causes thrust forces F1, F2, F3, F4, F5, and F6 to be generated against partial inner surfaces of the plurality of through holes, thereby generating tensile stresses in a yoke part region or a "main magnetic flux region" of the stator core. For details, reference can be made to the description of the first through hole and the first pin. The term "main magnetic flux region" here can be construed as the yoke part region, that is, an annular region surrounding a tooth part. It is understood that there may be more or fewer pins and through holes as needed. In this embodiment, it can be seen that the plurality of protrusions of the end covers are substantially evenly distributed such that the generation of tensile stresses is relatively evenly distributed. However, this is not essential and an optimized arrangement can be made according to the design. In one embodiment, two pins can be used for connection, and the two pins can be substantially located in opposite positions.

Figure 6B:
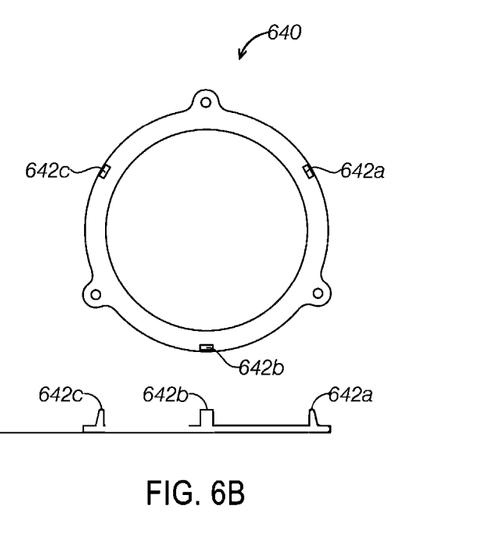

In another embodiment, as shown in FIG. 6B, it can be seen that an end cover 640 is provided with three contact parts 642a, 642b, and 642c that are substantially evenly distributed. In the example shown in FIG. 6B, the main body part formed by a plurality of stacked electromagnetic steel sheets can be correspondingly provided with at least a first through hole, a second through hole, and a third through hole penetrating axially. The three through holes may be spaced apart from each other by 120 degrees, and the three pins may be spaced apart from each other by approximately 120 degrees, such that thrust forces and tensile stresses in the corresponding material are generated and distributed evenly. In addition, it is understood that the shapes of the through hole and the contact part, as well as the cross-sectional shape of the pin, can be differently designed according to requirements. In the embodiments shown in FIG. 6A and FIG. 6B, the plurality of contact parts are arranged around the circumference of the end cover. It is understood that in other embodiments, the plurality of contact parts may be arranged in other suitable locations, such as arranged at least partially outside the circumference, similar to the arrangement of fastener through holes.

Figure 6C:
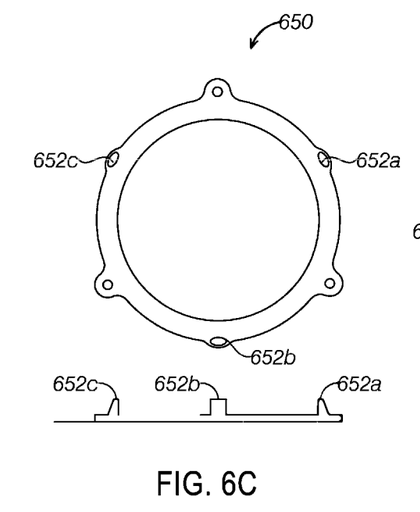

Please refer to another embodiment of FIG. 6C. It can be seen that an end cover 650 of this embodiment is provided with three elliptical contact parts 652a, 652b, and 652c that are substantially evenly distributed. Each of the contact parts 652a, 652b, and 652c may be partially located outside or entirely outside an annular outer circumference of the end cover 650. Correspondingly, substantially elliptical through holes may be provided in the stator core. The three pins 652a, 652b, and 652c may have substantially circular or elliptical cross sections, and are spaced apart from each other by approximately 120 degrees. It is understood that fewer or more pins are also feasible.

Figure 6D:
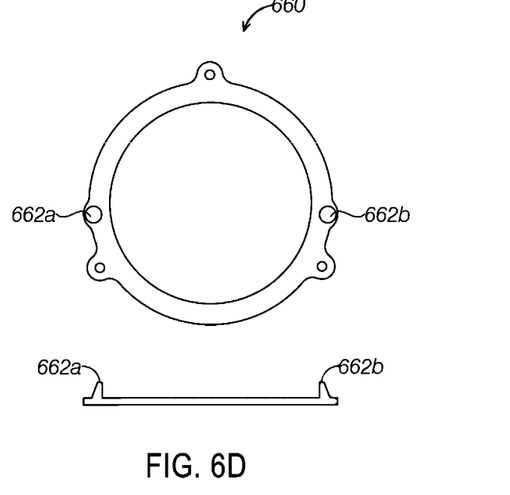

Please refer to another embodiment illustrated in FIG. 6D. An end cover 660 has two contact parts 662a and 662b. The two contact parts 662a and 662b have circular cross sections. Each of the contact parts 662a, 662b is partially or entirely located outside an annular outer circumference of the end cover 650. In this example, a corresponding main body part formed by a plurality of stacked electromagnetic steel sheets can correspondingly be provided with at least a first through hole and a second through hole penetrating axially. The first through hole and the second through hole may respectively include a first pin and a second pin extending therein, and the first pin and the second pin are used for connecting the plurality of electromagnetic steel sheets into one piece.

Although one or a plurality of the contact parts on the end covers in FIG. 6A to FIG. 6D protrude, it is understood that connections can also be implemented by forming recesses on the inner surface of the end cover as described above with reference to FIG. 4, and arranging a corresponding quantity of through holes in the stator, as well as a corresponding quantity of pins passing through the through holes and partially extending out of the through holes.

In an embodiment of the present application, the main body part of the stator may further include a fastener through hole penetrating axially through the first and second end covers and the main body part, and an axial fastener extending through the fastener through hole. The stator is entirely fixedly connected in the axial direction by the fastener. The axial force of the fastener is transmitted by the first and second ends to one or a plurality of pins to be converted into a radial force in the main body part, thereby generating radial and tangential tensile stresses in the main body part (i.e., the electromagnetic steel sheets), thereby facilitating reduction of iron loss in the stator core. In addition, in the stator, an axial locking and connecting member of the plurality of electromagnetic steel sheets can be obtained by the fitting of the one or plurality of pins with the first end cover and the second end cover. That is, the pin functions to connect and fix the electromagnetic steel sheets, for replacing the fixing manner of using welding joints and fastenings between the plurality of electromagnetic steel sheets. In one or a plurality of embodiments, the fastener through hole and the plurality of through holes for receiving the pins are at least partially arranged outside peripheral main magnetic flux regions of the main body part and the first and second end covers.

Figure 7A:
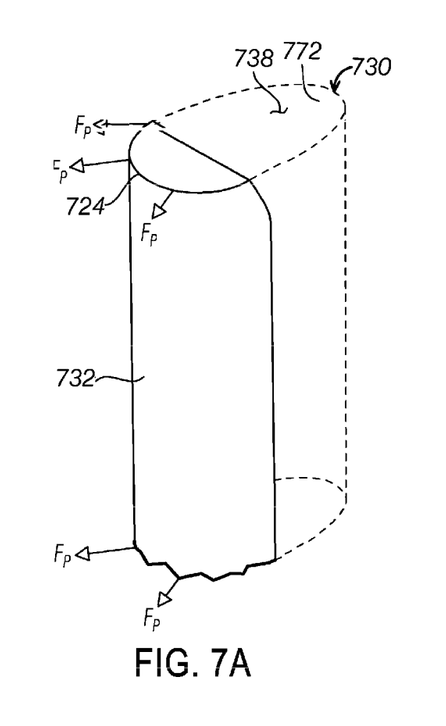
FIG. 7A, FIG. 7B, and FIG. 7C are schematic views of a variety of representative structures of a pin according to one or a plurality of embodiments of the present application.
Figure 7B:
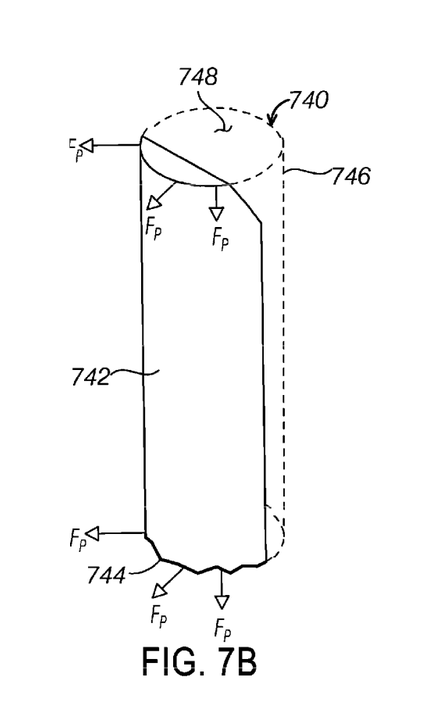
Figure 7C:
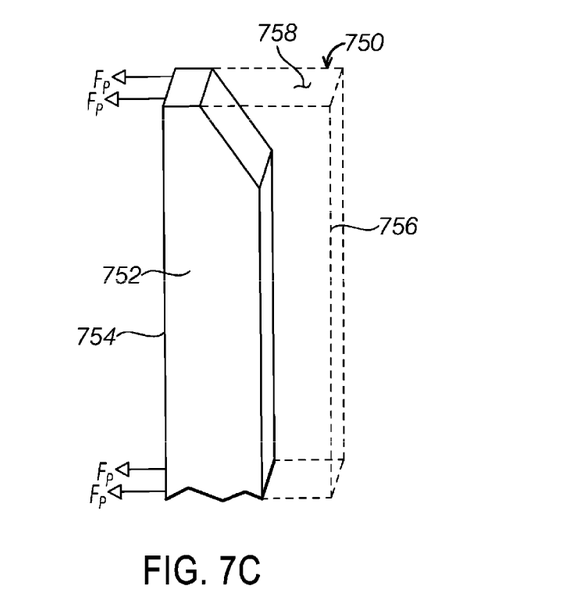

The shape of the one or plurality of pins in the foregoing or other locations of the present application can have a variety of suitable designs. In the embodiments described above, substantially rectangular and circular through holes are shown, and the pins fitted therewith may have cross sections in any suitable shape, such as square, circular, or semi-circular cross sections, for example, as shown in FIG. 7A to FIG. 7C, which show a pin end part having an inclined surface at one end, and it is understood that both ends of the pin in FIG. 7A to FIG. 7C may have the same configuration, or the other end of the pin may be similarly integrated with the end cover at one side as in the example shown in FIG. 5. As shown in the drawings, the one or plurality of through holes for receiving the pins may be slightly larger in size than the cross sections of the pins, such that when one or a plurality of pins are inserted and complete connections, a thrust force can be generated on a surface away from the central axis. FIG. 7A schematically shows the outline of a through hole 730 located on a stator core, and a columnar pin 732 located therein. For the sake of simplicity, end parts of the pin are not shown, but only cross sections of the through hole 730 and the pin 732 are discussed here. The through hole 730 includes a first inner surface 722 adjacent to the center of the stator and a second inner surface 724 away from the center of the stator. As shown in FIG. 7A, $F_p$ represents a thrust force generated by the contact between the pin 732 and the second inner surface 734 of the through hole 730, and the first inner surface 722 can remain in a non-contact state with the pin 732. For example, a gap 738 exists to avoid pressing the yoke part to generate a compressive stress. In this example, the second inner surface 724 is a curved surface, and the thrust forces F are in radial directions. The thrust forces F in a plurality of directions will then generate tensile stresses in a plurality of directions in the material structure.

FIG. 7B shows a circular through hole 740 and a pin 742 located therein. The through hole 740 includes a first inner surface 746 adjacent to the center of a stator and a second inner surface 744 away from the center of the stator. The pin 742 has a semi-circular cross section. Similarly, the pin 742 generates a thrust force along the second inner surface 744, and the pin 742 is spaced apart from the first inner surface 746, i.e., by a gap 748. The thrust force $F_p$ is in a radial direction, and the thrust forces $F_p$ in a plurality of directions will then generate tensile stresses in a plurality of directions in the material structure.

Please refer to FIG. 7C. A substantially rectangular through hole 750 and a pin 752 having a rectangular cross section are shown. The through hole 750 includes a first inner surface 756 adjacent to the center of a stator and a second inner surface 754 away from the center of the stator. The pin 752 contacts and presses the second inner surface 754, wherein the pin 752 is spaced apart from the first inner surface 756 by a gap 758. In this embodiment, the second inner surface 754 is generally planar such that the directions of thrust forces $F_p$ applied to the second inner surface 754 are also generally perpendicular to the second inner surface 754. Specific embodiments of the cross sections of the plurality of pins and the shapes of the holes are listed above. It is understood that the shapes of the holes and the pins may be implemented in other manners, and the pins and the holes are combined with each other in different manners.

Please refer to FIG. 2 to FIG. 7. As described above, it is understood that the design of the first end cover and the second end cover may be varied as needed, they may be split or integrated with the pin at one end, and the stator core may include a corresponding quantity of pins in a suitable shape which are arranged and distributed in a variety of ways. In one or a plurality of embodiments, the plurality of pins may be made from a material having a low magnetic permeability or have surfaces coated with a material having a low magnetic permeability. The so-called low magnetic permeability may refer to a lower magnetic permeability with respect to the material of the iron core itself, and the pin itself or the coating material may be, but is not limited to, for example a stainless steel material.

Figure 8:
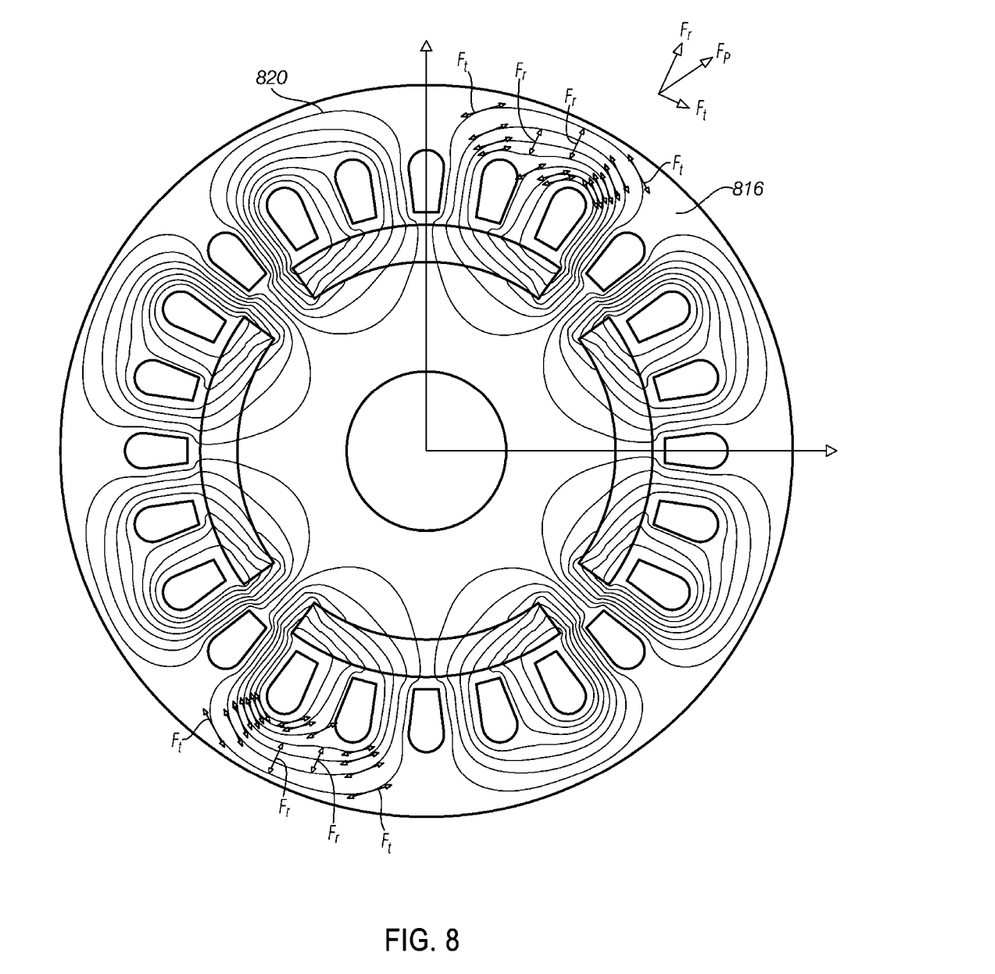
FIG. 8 is a schematic view of distribution of tensile stresses generated by an end cover and a pin and magnetic lines of force according to the embodiment shown in FIG. 2.

Please refer to FIG. 8, which is a schematic view of distribution of tensile stresses generated by an end cover and a pin and magnetic lines of force according to an embodiment of the present application. A region indicated by closed lines is a magnetic flux region 816 or a yoke part 816, and the closed lines 820 schematically represent magnetic lines of force. A tensile stress generated by the pin fitted with a first end cover and a second end cover in a through hole is represented by $F_p$. Arrows show directions of simulated tensile stresses, such as the radial tensile stress $F_r$ and the substantially tangential tensile stress $F_t$, and tensile stresses in different directions are generated at different points in the material structure. In the above one or plurality of embodiments, the directions of the tensile stresses generated at the yoke part in the plurality of through holes by the plurality of pins fitted with the first end cover and the second end cover at least partially substantially overlap with the magnetic flux direction. As shown in the drawing, Ft substantially overlaps with the magnetic lines of force 820. In general, as shown in the embodiment of FIG. 8, the direction of the tensile stress is $F_t$, and $F_r$ may be the plurality of radial directions as shown. However, the directions of at least a part of the tensile stresses are substantially coincident with the direction of the magnetic lines of force of the stator yoke part as shown. In one embodiment, an angle is formed by the direction of the tensile stress and the magnetic flux direction, and the angle is within 90 degrees. In another embodiment, angles formed by the directions of at least a part of the tensile stresses and the magnetic flux direction are within 45 degrees.

A stator core is provided in one or a plurality of embodiments of the present application, including: a main body part formed by a plurality of stacked electromagnetic steel sheets, the main body part being provided with at least a first through hole and a second through hole penetrating axially; a first pin and a second pin extending in the first through hole and the second through hole, respectively, the first pin and the second pin being used for integrating the plurality of electromagnetic steel sheets; a first end cover located at a first end of the main body part and contacting the first pin and the second pin; and a second end cover located at a second end of the main body part and contacting the first pin and the second pin, wherein the first pin and the second pin are interference-fitted with the first end cover and the second end cover to generate tensile stresses in a main magnetic flux region of the main body part. The main body part further includes a fastener through hole penetrating axially through the first and second end covers and the main body part, and an axial fastener extending through the fastener through hole. The axial connection of the plurality of electromagnetic steel sheets can be achieved by the fitting of the first pin and the second pin with the first end cover and the second end cover, and tensile stresses can be generated, thereby facilitating reduction of iron loss in the stator core. In the described embodiment, the axial connection can be achieved without the need for welding joints and fastenings between the plurality electromagnetic steel sheets and without the need for an adhesive. The fastener through hole and the plurality of through holes for receiving the pins are at least partially arranged outside the peripheral main magnetic flux regions of the main body part and the first and second end covers, such that the adverse effect on the effective magnetic flux region can be minimized as much as possible. Those skilled in the art can make various changes, modifications and variations to the specific embodiments without departing from the spirit and scope of the present application as defined by the claims.

Specific combinations and sub-combinations considered to be novel and non-obvious are specifically pointed out in the claims. The claims may involve "an" element or "first" element or a similar feature. Such claims should be construed as including one or a plurality of such elements, neither requiring nor excluding two or more such elements. Other combinations and sub-combinations of the described features, functions, elements and/or characteristics may be claimed by modifying the current claims or by being proposed in the present application or related applications. Such claims, whether broader than, narrower than, equivalent to, or different from the original claims, should be considered as being included the subject of the present application.

While representative embodiments are described above, it is not intended that these embodiments describe all possible forms of the claimed subject matter. The words used in the specification are words of description rather than limitation, and it is understood that various changes may be made without departing from the spirit and scope of the disclosure and claimed subject matter. Additionally, the features of various implementing embodiments may be combined to form further embodiments not explicitly described or illustrated, but within the scope of the disclosure and claimed subject matter and recognizable to one of ordinary skill in the art.

Furthermore, while various embodiments may have been described as providing advantages or being preferred over other embodiments or prior art implementations with respect to one or more desired characteristics, as one of ordinary skill in the art is aware, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. Embodiments described as less desirable than other embodiments or prior art implementations with respect to one or more characteristics are not necessarily outside the scope of the disclosure and may be desirable for particular applications.

What is claimed is:

1. A stator core, comprising:
   a main body part formed by a plurality of stacked electromagnetic steel sheets, the main body part being provided with at least a first through hole extending axially;
   a first pin located in the first through hole, wherein the first pin is made from a non-magnetically permeable material;
   a first end cover located at a first end of the main body part and connected to a first pin end of the first pin; and
   a second end cover located at a second end of the main body part and connected to a second pin end of the first pin, wherein connections of the first end cover and the second end cover to the first pin generate tensile stresses in the main body part.

2. The stator core according to claim 1, wherein the first through hole has a first inner surface closer to a central axis of the stator core than a second inner surface, the first pin is spaced apart from the first inner surface, and wherein the first pin contacts the second inner surface and generates a thrust force against the first inner surface.

3. The stator core according to claim 2, wherein the first pin end of the first pin is connected to the first end cover by means of an interference fit, and wherein the second pin end of the first pin is integrated with the second end cover.

4. The stator core according to claim 1, wherein the first pin end of the first pin is connected to the first end cover by an interference fit, and the second pin end of the first pin is connected to the second end cover by an interference fit.

5. The stator core according to claim 1, wherein the first end cover has a first contact part protruding from an inner surface of the first end cover to contact the first pin, the second end cover has a second contact part protruding from an inner surface of the second end cover to contact the first pin, the first and second contact parts are configured to be interference-fitted with the first pin such that the first pin generates a thrust force against a part of an inner surface of the first through hole, thereby generating a tensile stress in a main magnetic flux region of the stator core.

6. The stator core according to claim 1, wherein:
   the first end cover has a first contact part protruding from an inner surface of the first end cover to contact the first pin, the second end cover has a second contact part protruding from an inner surface of the second end cover to contact the second pin;
   the inner surface of the first end cover has a first recess adjacent to the first contact part to receive the first pin end, and a part of an outer wall of the first contact part forms an inner wall of the first recess;
   the inner surface of the second end cover has a recess adjacent to the second contact part to receive the second pin end, and a part of an outer wall of the second contact part forms an inner wall of the second recess; and
   the first contact part is configured to be interference-fitted with the first pin such that the first pin generates a thrust force against a part of an inner surface of the first through hole and generates a tensile stress in a main magnetic flux region of the stator core.

7. The stator core according to claim 1, wherein the first pin end comprises a first inclined surface facing toward a central axis, the first end cover has a first contact part protruding from an inner surface thereof to be fitted with the first inclined surface, a surface of the first contact part opposite the first inclined surface is an inclined surface, and the first contact part is interference-fitted with the first inclined surface such that the first pin generates a thrust force against a part of an inner surface of the first through hole and generates a tensile stress in a main magnetic flux region of the stator core.

8. The stator core according to claim 1, wherein:
   the first pin end comprises a first inclined surface facing toward a central axis, the first end cover has a first contact part protruding from an inner surface thereof to be fitted with the first inclined surface, and a surface of the first contact part opposite the first inclined surface is an inclined surface;
   the second pin end comprises a second inclined surface facing toward the central axis, and the second end cover has a second contact part protruding from an inner surface thereof to be fitted with the second inclined surface, and a surface of the second contact part opposite the second inclined surface is an inclined surface; and
   the first contact part is interference-fitted with the first inclined surface and the second contact part is interference-fitted with the second inclined surface such that the first pin generates a thrust force against a part of an inner surface of the first through hole and generates a tensile stress in a main magnetic flux region of the stator core.

9. The stator core according to claim 1, wherein the first through hole is arranged close to an outer annular peripheral edge of the main body part.

10. The stator core according to claim 1, wherein the first through hole is partially located outside an annular peripheral edge of the main body part.

11. The stator core according to claim 1, wherein the stator core further comprises a second pin, and the main body part comprises a second through hole configured to receive the second pin.

12. The stator core according to claim 1, wherein the stator core further comprises a second pin and a third pin, and the main body part further comprises a corresponding second through hole and a corresponding third through hole; and
wherein the first, second, and third through holes are evenly spaced apart from each other circumferentially, and the first and second end covers are interference-fitted with the first, second, and third pins such that tensile stresses are generated in a main magnetic flux region of the stator core along the through holes.

13. The stator core according to claim 1, wherein the stator core further comprises a second pin, a third pin, a fourth pin, a fifth pin, and a sixth pin;
wherein the main body part further comprises a second through hole, a third through hole, a fourth through hole, a fifth through hole, and a sixth through hole spaced apart from each other;
wherein the first and second end covers each comprise contact parts fitted with the second, third, fourth, fifth, and sixth pins;
wherein the fittings of the first and second end covers with the first, second, third, fourth, fifth, and sixth pins generate thrust forces against the plurality of through holes to generate tensile stresses in a main magnetic flux region of the stator core.

14. The stator core according to claim 13, wherein the first, second, third, third, fourth, fifth, and sixth through holes and the first, second, third, fourth, fifth and sixth pins have substantially the same structure, and the plurality of through holes are evenly distributed along a circumference of the main body part.

15. A stator core, comprising:
a main body part formed by a plurality of stacked electromagnetic steel sheets, the main body part defining a first through hole, a second through hole, and a third through hole extending axially;
a first pin, a second pin, and a third pin extending in the first, second and third through holes, respectively;
a first end cover located at a first end of the main body part and contacting the first pin, the second pin, and the third pin;
a second end cover located at a second end of the main body part and contacting the first pin, the second pin, and the third pin; the first pin, the second pin, and the third pin being interference-fitted with the first end cover and the second end cover to generate tensile stresses in a main magnetic flux region of the main body part;
a fastener through hole penetrating axially through the first and second end covers and the main body part; and
a fastener extending through the fastener through hole, wherein
the first pin, the second pin, the third pin, the first end cover, the second end cover, and the fastener together form a connection structure for connecting the plurality of electromagnetic steel sheets, and a welding joint does not exist between any adjacent steel sheets of the plurality of electromagnetic steel sheets;
and wherein the first end cover comprises a first contact part, a second contact part, and a third contact part protruding from an inner surface thereof, the first, second, and third contact parts respectively contacting first pin ends of the first, second, and third pins; and the second end cover comprises a fourth contact part, a fifth contact part, and a sixth contact part protruding from an inner surface thereof, the fourth, fifth, and sixth contact parts respectively contacting second pin ends of the first, second and third pins.

16. A stator core, comprising:
a main body part formed by a plurality of stacked electromagnetic steel sheets, the main body part being provided with at least a first through hole and a second through hole each extending axially;
a first pin located in the first through hole;
a second pin located in the second through hole;
a first end cover located at a first end of the main body part and connected to a first pin end of the first pin; and
a second end cover located at a second end of the main body part and connected to a second pin end of the first pin, wherein connections of the first end cover and the second end cover to the first pin generate tensile stresses in the main body part.

17. The stator core of claim 16, wherein the first through hole is arranged close to an outer annular peripheral edge of the main body part.

18. The stator core of claim 16, wherein the first pin is made from a non-magnetically permeable material.

19. The stator core of claim 16, wherein the first end cover has a first contact part protruding from an inner surface of the first end cover to contact the first pin, the second end cover has a second contact part protruding from an inner surface of the second end cover to contact the first pin, the first and second contact parts are configured to be interference-fitted with the first pin such that the first pin generates a thrust force against a part of an inner surface of the first through hole, thereby generating a tensile stress in a main magnetic flux region of the stator core.

20. The stator core of claim 16, wherein the first pin end comprises a first inclined surface facing toward a central axis, the first end cover has a first contact part protruding from an inner surface thereof to be fitted with the first inclined surface, a surface of the first contact part opposite the first inclined surface is an inclined surface, and the first contact part is interference-fitted with the first inclined surface such that the first pin generates a thrust force against a part of an inner surface of the first through hole and generates a tensile stress in a main magnetic flux region of the stator core.

* * * * *